(12) United States Patent
Brehmer et al.

(10) Patent No.: US 9,518,567 B2
(45) Date of Patent: Dec. 13, 2016

(54) ADJUSTING DEVICE OF A HYDROSTATIC MODULE

(75) Inventors: Udo Brehmer, Constance (DE); Bernd Schraff, Friedrichshafen (DE); Roland Rehtanz, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 346 days.

(21) Appl. No.: 14/006,350

(22) PCT Filed: Feb. 2, 2012

(86) PCT No.: PCT/EP2012/051765
§ 371 (c)(1),
(2), (4) Date: Sep. 20, 2013

(87) PCT Pub. No.: WO2012/130505
PCT Pub. Date: Oct. 4, 2012

(65) Prior Publication Data
US 2014/0000449 A1 Jan. 2, 2014

(30) Foreign Application Priority Data
Mar. 25, 2011 (DE) .................. 10 2011 006 102

(51) Int. Cl.
*F04B 1/29* (2006.01)
*F15B 13/04* (2006.01)
(Continued)

(52) U.S. Cl.
CPC .............. *F04B 1/29* (2013.01); *F01B 3/0032* (2013.01); *F04B 1/10* (2013.01); *F04B 1/20* (2013.01);
(Continued)

(58) Field of Classification Search
CPC .............. F04B 1/29; F04B 1/328; F04B 1/10; F04B 1/20; F04B 1/2078; F15B 13/0416; F15B 9/08; F16H 61/42; F01B 3/0032
(Continued)

(56) References Cited

U.S. PATENT DOCUMENTS 3,733,963 A 5/1973 Kubilos
5,205,201 A 4/1993 Gollner
(Continued)

FOREIGN PATENT DOCUMENTS

DE 2 215 891 10/1972
DE 33 46 000 A1 6/1984
(Continued)

OTHER PUBLICATIONS

German Search Report Corresponding to 10 2011 006 102.9 mailed Feb. 10, 2012.
(Continued)

*Primary Examiner* — Dominick L Plakkoottam
(74) *Attorney, Agent, or Firm* — Davis & Bujold, PLLC; Michael J. Bujold

(57) ABSTRACT

An adjusting device of an axial piston machine having a displacement volume that is adjusted by a pivoting yoke. The adjusting device has a cylinder, which is radially spaced from and tangential to the yoke pivot axis. A piston communicates with the yoke and is adjusted by hydraulic pressure change. A control arrangement has a position regulating valve with a control piston which can set the hydraulic pressure acting on the piston. A mechanical return can transfer the yoke pivoting position to the control piston. The valve is axially parallel to the cylinder and radially spaced from the yoke pivot axis. The return comprises an axially movable sensing piston and coaxial return spring which are axially adjacent to the valve. The sensing piston (Continued)

abuts a yoke surface that is eccentric with respect to the pivot axis and connected to the control piston by the return spring.

11 Claims, 3 Drawing Sheets

(51) Int. Cl.
    *F16H 61/42*     (2010.01)
    *F15B 9/08*     (2006.01)
    *F04B 1/10*     (2006.01)
    *F01B 3/00*     (2006.01)
    *F04B 1/32*     (2006.01)
    *F04B 1/20*     (2006.01)

(52) U.S. Cl.
    CPC ............... *F04B 1/328* (2013.01); *F15B 9/08* (2013.01); *F15B 13/0416* (2013.01); *F16H 61/42* (2013.01); *F04B 1/2078* (2013.01)

(58) Field of Classification Search
    USPC .................. 91/387; 92/56, 57; 60/491, 492
    See application file for complete search history.

(56) References Cited

U.S. PATENT DOCUMENTS

| | | | |
|---|---|---|---|
| 6,260,468 B1* | 7/2001 | Ryken | ............... F04B 1/324 91/506 |
| 6,837,046 B2 | 1/2005 | Gollner | |
| 6,883,320 B2 | 4/2005 | Tyler | |
| 2007/0137475 A1* | 6/2007 | Reimer | ............... F01B 3/0002 91/505 |
| 2007/0277520 A1 | 12/2007 | Gollner | |
| 2010/0107626 A1* | 5/2010 | Nelson | ............... F16H 39/14 60/491 |
| 2010/0199838 A1 | 8/2010 | Krebs et al. | |
| 2011/0061524 A1* | 3/2011 | Haffner | ............... F16H 61/423 92/12.1 |
| 2014/0116242 A1* | 5/2014 | Howind | ............... F04B 1/32 91/374 |

FOREIGN PATENT DOCUMENTS

| | | |
|---|---|---|
| DE | 196 53 165 C1 | 4/1998 |
| DE | 100 43 451 A1 | 4/2001 |
| DE | 101 38 554 C1 | 1/2003 |
| DE | 10 2005 060 960 B3 | 6/2007 |
| DE | 10 2006 025 347 B2 | 12/2007 |
| DE | 10 2008 038 435 A1 | 2/2009 |
| DE | 10 2008 002 140 A1 | 12/2009 |
| DE | 10 2008 031 768 A1 | 1/2010 |
| JP | 2005-201175 A | 7/2005 |

OTHER PUBLICATIONS

International Search Report Corresponding to PCT/EP2012/051765 mailed Apr. 18, 2012.

Written Opinion Corresponding to PCT/EP2012/051765 mailed Apr. 18, 2012.

* cited by examiner

ADJUSTING DEVICE OF A HYDROSTATIC MODULE

This application is a National Stage completion of PCT/EP2012/051765 filed Feb. 2, 2012, which claims priority from German patent application serial no. 10 2011 006 102.9 filed Mar. 25, 2011.

FIELD OF THE INVENTION

The invention relates to an adjusting device of a hydrostatic module comprising at least one axial piston machine, which can be adjusted in terms of the displacement volume thereof by means of pivoting the yoke, the adjusting device having a hydraulic adjusting cylinder, which is disposed radially spaced apart from and tangential with respect to the pivot axis of the yoke, the hydraulic adjusting cylinder having an adjusting piston, which is operatively connected to the yoke by means of a pivot lever and which can be acted on at two opposing piston surfaces with an adjusting pressure difference of a hydraulic pressure medium, and having a control arrangement, which has a position regulating valve in the form of an electromagnetically controllable hydraulic proportional valve having a control piston, by means of the axial position of which the adjusting pressure difference acting on the adjusting piston of the adjusting cylinder can be set, and having a non-positively locking mechanical return device, by means of which the pivoting position of the yoke can be transferred to the control piston of the position regulating valve.

BACKGROUND OF THE INVENTION

Known designs of a hydrostatic axial piston machine are the band axis motor and the swash plate motor. Such axial piston machines can be used as a hydrostatic pump or as a hydrostatic motor with an essentially identical structure. In the case of a band axis motor, a drive flange is rigidly connected to the allocated drive shaft. The piston rods of multiple displacement pistons are mounted in a jointed arrangement so that they are evenly distributed peripherally on the drive flange. The displacement pistons are each disposed in one of several axial cylinder bores correspondingly disposed such that they are peripherally distributed in a cylinder block. The cylinder block is drivingly connected to the drive shaft, for example by means of a central cardan shaft, and is rotatably mounted about its axis of rotation in a yoke, by means of the pivoting of which about a pivot axis extending perpendicular to the central axis of the drive shaft, the displacement volume of the band axis motor can be modified or adjusted. The skew angle range of a band axis motor is 45° (+/−5°) for a one-sided adjustment and is +/−45° (+/−5°) for a double-sided adjustment, i.e. with direction reversal.

In the case of a swash plate motor, a cylinder block, with multiple axial cylinder bores disposed such that they are peripherally distributed thereon, is rigidly connected to the allocated drive shaft. A displacement piston is disposed in each of the cylinder bores, the piston rod of each displacement piston being in sliding contact with an axially adjacent swash plate by means of a sliding shoe. The swash plate is rigidly or integrally connected to a yoke, by means of the pivoting of which about a pivot axis extending perpendicular to the central axis of the drive shaft, the displacement volume of the swash plate motor can be modified or adjusted. The skew angle range of a swash plate motor is 20° (+/−5°) for a one-sided adjustment and is +/−20° (+/−5°) for a double-sided adjustment, i.e. with direction reversal.

For example, a hydrostatic module is disclosed in DE 10 2008 002 140 A1 with reference to DE 10 2006 025 347 B3, which comprises two band axis motors that are hydraulically coupled with one another, the cylinder blocks of which band axis motors are disposed in a pivotable yoke so that they are offset to one another with respect to a common pivot axis. One of the band axis motors operates as a hydrostatic pump and can be driven by a drive motor by means of the allocated drive shaft. The other band axis motor operates as a hydrostatic motor and can deliver torque to a consumer load by means of an allocated drive shaft. Because of the offset arrangement of the cylinder blocks, when the yoke pivots from a neutral resting position, the displacement volume of the hydrostatic pump is increased, and the displacement volume of the hydrostatic motor is reduced to the same extent. The hydrostatic module thus forms a steplessly adjustable hydrostatic transmission, which, for example, could be used in wheel-mounted front-end loaders as the only gear box and in tractors in conjunction with a manual transmission disposed parallel to that hydrostatic module as a load-sharing transmission.

The adjusting device of the hydrostatic module disclosed in DE 10 2008 002 140 A1, in which the yoke can be pivoted about its pivot axis and therefore the gear ratio of the hydrostatic transmission can be adjusted, comprises a hydraulic adjusting cylinder with an adjusting piston such that the hydraulic adjusting cylinder is axially disposed centered between the two band axis motors in a base plate in which the bearings of the yoke are integrated radially spaced apart from one another, and tangential with respect to the pivot axis of the yoke. The adjusting piston is in operative connection with the yoke by means of a pivot lever that is radially aligned with respect to the pivot axis of the yoke, rigidly connected to the yoke, and slidably and rotatably mounted by means of a ball end in a radial bore of the adjusting piston. Thus an axial displacement of the adjusting piston causes the yoke to pivot about its pivot axis, and therefore causes an adjustment of the displacement volume of the two band axis motors. For the axial displacement of the adjusting piston, this piston can be acted on by means of a valve arrangement, not described in greater detail here, at two opposing piston surfaces with an adjusting pressure difference of a hydraulic pressure medium.

In contrast to other possible valve arrangements for controlling the adjusting cylinder, the present invention starts with a control arrangement having a relatively simple design, which comprises a position regulating valve in the form of an electromagnetically controllable hydraulic proportional valve having a control piston, by means of the axial position of which the adjusting pressure difference acting on the adjusting piston of the adjusting cylinder can be set, and a non-positive locking mechanical return device, by means of which the pivoting position of the yoke can be transferred to the control piston of the position regulating valve.

A control arrangement of this kind, with a pressure-controlled position regulating valve, is disclosed in U.S. Pat. No. 5,205,201 A, the position regulating valve being disposed axially parallel to the adjusting cylinder and being operatively connected to the adjusting piston of the adjusting cylinder by means of a non-positive locking mechanical return device. The return device comprises a connecting rod, a casing and a return spring in the form of a helical spring. The casing is disposed inside the valve housing of the position regulating valve in an expanded pressure space coaxially over the return spring as well as an extended portion of the control piston, and is connected to the adjusting piston of the adjusting cylinder on one side by means of a connecting rod, and to the control piston of the position regulating valve on the other side by means of the return spring.

DE 196 53 165 C2 discloses such a control arrangement having an electromagnetically controllable position regulating valve, which is disposed coaxially to and axially adjacent to the adjusting cylinder, and which is operatively connected to the adjusting piston of the adjusting cylinder by means of a non-positive locking mechanical return device. The return device comprises a return spring in the form of a helical spring, which is disposed inside the adjusting cylinder between the adjusting piston and the control piston of the adjacent position regulating valve.

Lastly, DE 101 38 554 C1 discloses such a control arrangement having two pressure-controlled or electromagnetically controllable position regulating valves, which are eccentrically disposed with a radial alignment adjacent to the adjusting cylinder, and each of which being operatively connected to the adjusting piston of the adjusting cylinder by means of a non-positive locking mechanical return device. The return device comprises a sensing piston adjacent to an eccentric conical portion of the adjusting piston and a return spring disposed between the respective sensing piston and the control piston of the allocated position regulating valve.

In the case of the known control arrangements, it is not the pivoting position of the respective hydrostatic module, but rather the control position of the adjusting piston of the adjusting cylinder that is operatively connected to the yoke that can be transferred to the control piston of the allocated position regulating valve by means of the return device. In this way, an unavoidable, existing play in the control connection between the adjusting piston of the adjusting cylinder and the yoke is not registered, which leads to a certain degree of imprecision in the position control of the yoke. Likewise in this way, the progressive gear ratio of the control connection between the adjusting piston of the adjusting cylinder and the yoke is not registered, which leads to an increased rate of change in the pivot angle of the yoke when there is increased deflection of the adjusting piston, which inevitably leads to an increased imprecision in the position control of the yoke with an increased pivoting angle of the yoke.

SUMMARY OF THE INVENTION

The objective of the present invention is therefore to propose an adjusting device of a hydrostatic module of the type previously mentioned, the control arrangement of which exhibits increased precision in the position control of the yoke with the simplest possible design.

Accordingly, the invention relates to an adjusting device of a hydrostatic module comprising at least one axial piston machine (diagrammatically shown in FIG. 2), which can be adjusted in terms of the displacement volume thereof by means of pivoting the yoke. The adjusting device has an adjusting cylinder with an adjusting piston disposed radially spaced apart from and tangential with respect to the pivot axis of the yoke, which is operatively connected to the yoke via a pivot lever and which can be acted on at two opposing piston surfaces with an adjusting pressure difference of a hydraulic pressure medium. An allocated control arrangement comprises a position regulating valve in the form of an electromagnetically controllable hydraulic proportional valve having a control piston, by means of the axial position of which the adjusting pressure difference acting on the adjusting piston of the adjusting cylinder can be set, and a non-positive locking mechanical return device, by means of which the pivoting position of the yoke can be transferred to the control piston of the position regulating valve.

According to the invention, the position regulating valve is disposed axially parallel to the adjusting cylinder and disposed radially spaced apart from the pivot axis of the yoke. The return device comprises an axially movable, guided sensing piston and a return spring in the form of a helical spring, which are disposed coaxially and axially adjacent to the position regulating valve. The sensing piston rests against a feedback surface eccentrically disposed on the yoke with respect to the pivot axis and is operatively connected to the control piston of the position regulating valve by means of the return spring.

This control arrangement is constructed in a simple and space-saving manner and fulfills the proposed purpose of a direct, non-positive locking return of the pivoting position of the yoke to the adjusting piston of the position regulating valve. The imprecision in the position control of the yoke caused by the return of the control position of the adjusting piston of the adjusting cylinder in the known control arrangements is thereby comparatively easily and effectively eliminated.

In order to obtain an accurate return that transfers the pivoting position of the yoke in the desired manner, that is, progressively, linearly or degressively to the position control valve, the contour of the feedback surface is preferably convexly formed and adapted to the desired control characteristic of the position control of the yoke.

In order to be able to easily modify the control characteristic of the position control or adapt that control characteristic to the respective application, the feedback surface is advantageously disposed on a component that is removably attached to the yoke. In order to modify the control characteristic, the existing component must only be replaced by a component having another feedback surface contour. If applicable, it may be necessary to replace the return spring with a spring having a different length and/or spring stiffness.

The sensing piston can be in contact with the feedback surface of the yoke such that the sensing piston can slide by means of a smooth anti-friction surface disposed on the outer end thereof.

In order to achieve the lowest possible friction, and thereby an especially precise return of the pivoting position of the yoke, however, it may also be provided that the sensing piston is in contact with the feedback surface of the yoke by means of a ball mounted at the end of the sensing piston, the ball being rotatably mounted in a spherical indentation such that the sensing piston can roll, or by means of a roller at the outer end of that sensing piston, the roller being rotatably mounted about an axis oriented parallel to the pivot axis of the yoke such that the sensing piston can roll.

In order to ensure that the return spring is guided both centrally and with as little friction as possible, this return spring is preferably guided in a central blind hole of the sensing piston on one side, and on a spring cap centrally disposed on the control piston of the position regulating valve on the other side.

The sensing piston is guided in a bore of a component fixed to the housing such that the piston can suitably slide in an axial direction.

When the position regulating valve has a cartridge design, as is preferably provided in the present case, that position regulating valve can also be disposed in a bore of a component fixed to the housing.

Thus it is possible that the sensing piston, the return spring and the position regulating valve be disposed in a stepped bore of a base plate of the hydrostatic module, in which the bearings of the yoke are integrated, that is, in a common bore of a single component fixed to the housing, which can be realized in an especially cost-effective and space-saving manner.

BRIEF DESCRIPTION OF THE DRAWINGS

To illustrate the invention, drawings having example embodiments accompany the description. Shown are.

DETAILED DESCRIPTION OF THE PREFERRED EMBODIMENTS

Figure 1:
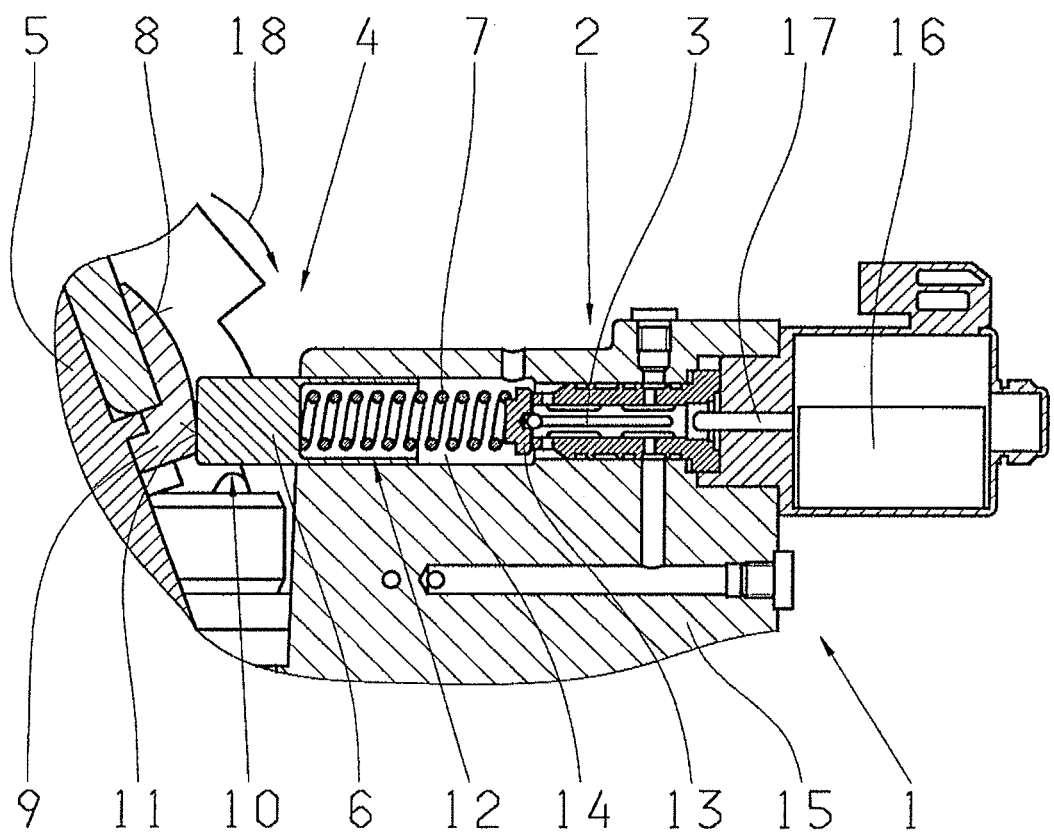
FIG. 1 a sectional view of a control arrangement of a hydrostatic module according of the invention, FIG. 2 a sectional view of a first refinement of the control arrangement according to the invention according to FIG. 1, and FIG. 3 a sectional view of a second refinement of the control arrangement according to the invention according to FIG. 1.
Figure 2:
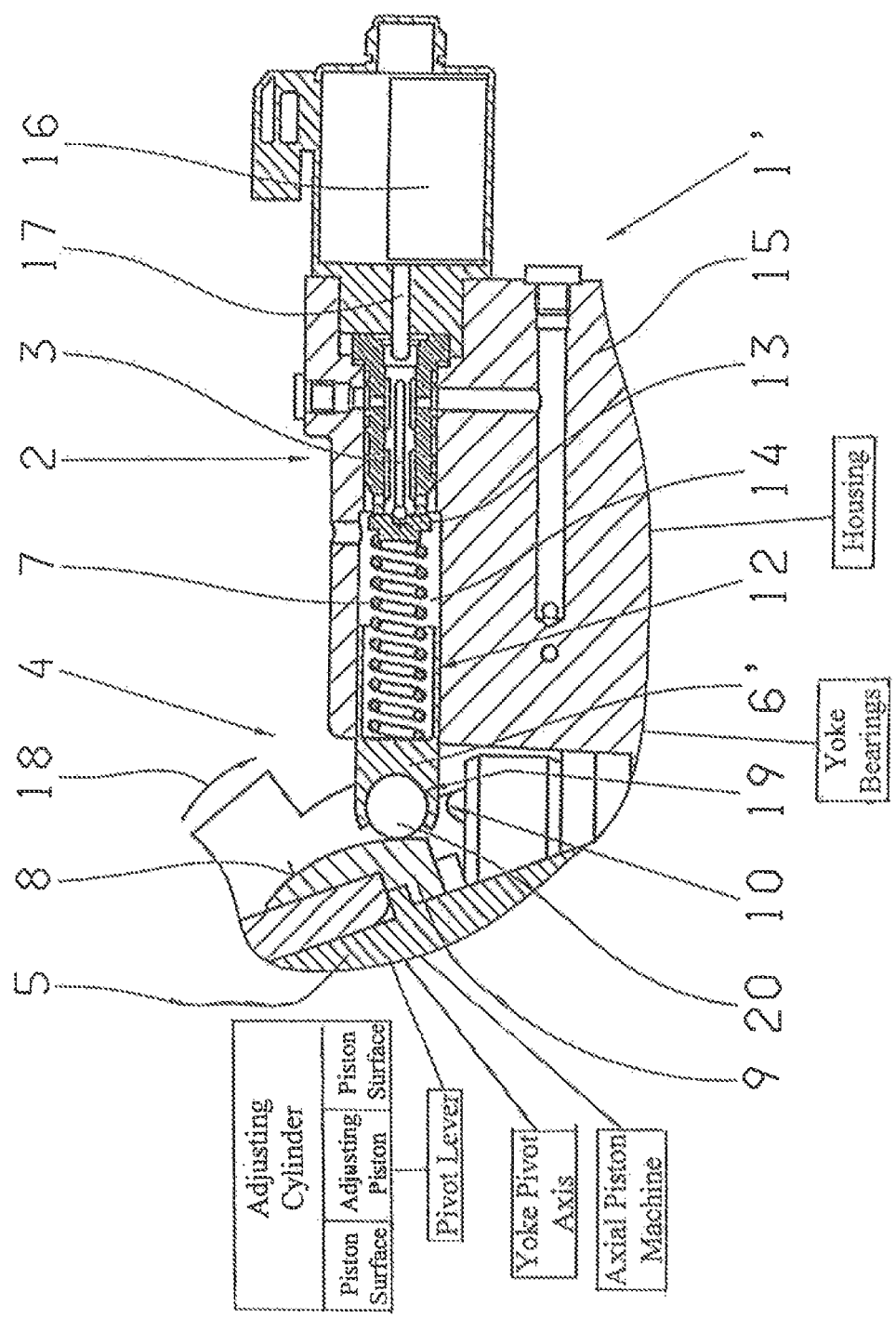
Figure 3:
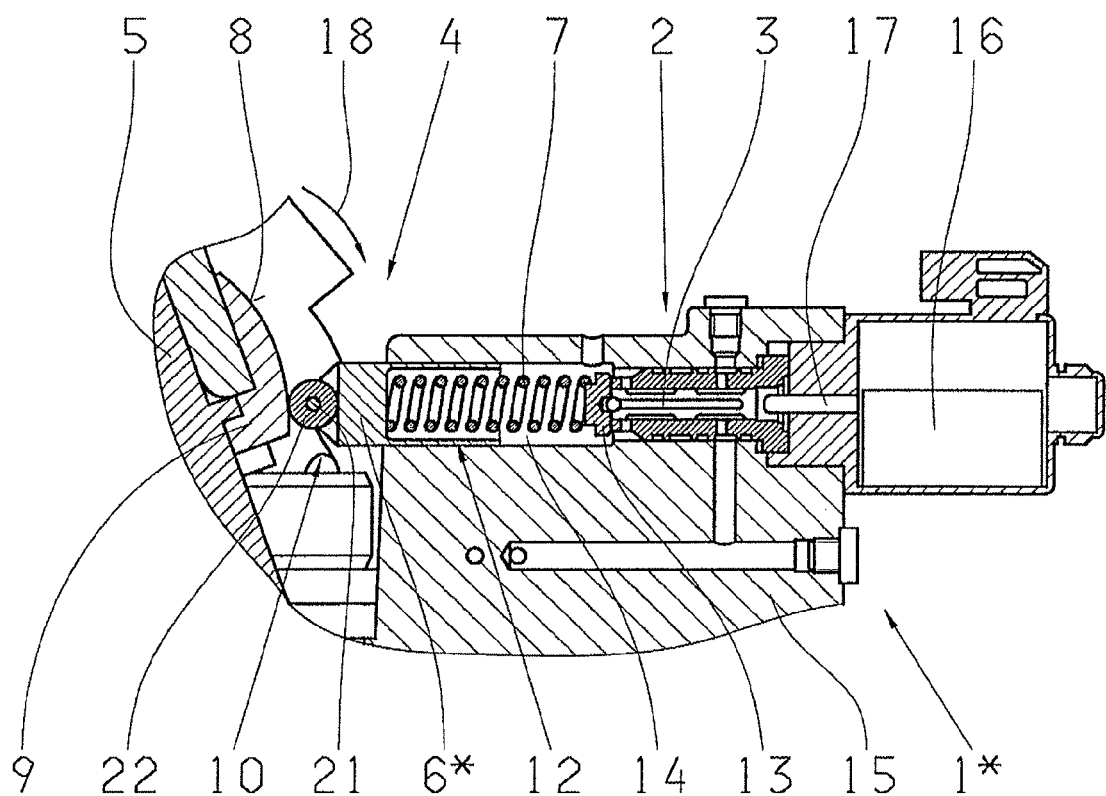

FIG. 1 to FIG. 3 each show a control arrangement 1, 1', 1* according to the invention, which are used to control a hydraulic adjusting cylinder (diagrammatically shown in FIG. 2), the control arrangement being disposed radially spaced apart from and tangential with respect to the pivot axis of a yoke 5 of a hydrostatic module, and being operatively connected to the yoke 5 by means of a pivot lever. Through the pivoting of the yoke 5 by the adjusting cylinder, the displacement volume of at least one axial piston machine is adjusted. For a better understanding, it is possible to start with a design of the hydrostatic module as described in DE 10 2008 002 140 A1, for example, which comprises two band axis motors that are hydraulically coupled with one another. The cylinder blocks of these two band axis motors are disposed in the pivotable yoke 5 offset to one another in reference to a common pivot axis. One of the band axis motors functions as a hydrostatic pump, and the other band axis motor functions as a hydrostatic motor, so that the hydrostatic module forms a steplessly adjustable hydrostatic transmission.

The control arrangement 1 according to FIG. 1 comprises a position regulating valve 2 in the form of an electromagnetically controllable hydraulic proportional valve having a control piston 3, by means of the axial position of which the adjusting pressure difference acting on the adjusting piston of the adjusting cylinder can be set, and a non-positive locking mechanical return device 4, by means of which the pivoting position of the yoke 5 can be transferred to the control piston 3 of the position regulating valve 2.

The position regulating valve 2 is disposed axially parallel to the adjusting cylinder and disposed radially spaced apart from the pivot axis of the yoke 5. The mechanical return device 4 comprises an axially movable, guided sensing piston 6 and a return spring 7 in the form of a helical spring, which are disposed coaxially and axially adjacent to the position regulating valve 2. The sensing piston 6 thereby rests against a feedback surface 8 eccentrically disposed on the yoke 5 with respect to the pivot axis and is operatively connected to the control piston 3 of the position regulating valve 2 by means of the return spring 7.

The feedback surface 8, the contour of which is convexly formed and adapted to the desired control characteristic of the position control of the yoke 5, is formed on a component 9 that is attached to the yoke 5 removable, and therefore easily replaced. The sensing piston 6 is in contact with the feedback surface 8 of the yoke 5 so that, that piston can slide by means of a smooth anti-friction surface 11 disposed on the outer end 10 of that sensing piston, and is guided in a bore 14 of a base plate 15 of the hydrostatic module, in which the bearings of the yoke 5 are incorporated so that the sensing piston can slide in an axial direction. The return spring 7 is guided in a blind hole 12 of the sensing piston 6 on one side, and on a spring cap 13 centered on the control piston 3 of the position regulating valve 2 on the other side.

In the present case, the position regulating valve 2 has a cartridge design and is disposed in a stepped section of the same bore 14. The electromagnet 16 of the position regulating valve 2 is disposed on the side facing away from the sensing piston 6 as well as the return spring 7 and is operatively connected to the control piston 3 of the position regulating valve 2 by means of an anchor pin 17.

When a specific pivoting position is to be set starting from a resting position of the yoke 5, the electromagnet 16 is energized with a specific control current and a specific control force is thereby generated, which is transferred to the control piston 3 of the position regulating valve 2 by means of the anchor pin 17. The control piston 3 is hereby displaced against the return force of the return spring 7 in the direction of the sensing piston 6, and this sensing piston frees openings along its control edges for connecting a high-pressure line and a low-pressure line with the two pressure chambers of the adjusting cylinder. The adjusting piston of the adjusting cylinder is thereby axially displaced and the yoke 5 is pivoted by means of the pivot lever in the desired manner according to the indicated pivot arrow 18.

This pivoting movement is registered by means of the sensing piston 6 abutting the feedback surface 8 of the yoke 5 and returned to the control piston 3 of the position regulating valve 2 by means of thereby higher tensioned return spring 7. The control piston 3 is thereby pushed far enough back in the direction of the electromagnet 16, and the effective adjusting pressure difference acting on the adjusting piston of the adjusting cylinder is sufficiently reduced until a balance of forces between the magnetic force acting on the anchor pin 17 and the spring force of the return spring 7 has been reached.

The components of the control arrangement 1, in particular the contour of the feedback surface 8, the spring stiffness of the return spring 7 and the magnetic force acting on the anchor pin 17, are matched to one another in such a way that the respective equilibrium point of the control piston 3 of the position regulating valve 2 corresponds to the desired pivoting position of the yoke 5. The pivoting position of the yoke 5 correlating to a specific magnetic force or to the corresponding control current of the electromagnet 16 is thereby automatically adjusted with a high degree of precision by means of the return device 4. Imprecisions that arise in the known control arrangements as a result of the return of the control position of the adjusting cylinder to the position regulating valve are thereby eliminated in the control arrangement 1 according to the invention.

A first further development of the control arrangement 1' according to FIG. 2 differs from what is otherwise the same design of the control arrangement 1 according to FIG. 1 in that the sensing piston 6' is now in contact with the feedback surface 8 of the yoke 5 by means of a ball 20 at the outer end 10 of that sensing piston, the ball being rotatably mounted in a spherical indentation 19 such that the sensing piston can rotate. This results in a lower-friction, and therefore more precise, return of the pivoting position of the yoke 5 to the position regulating valve 2.

A second further development of the control arrangement 1* according to the invention according to FIG. 3 differs from what is otherwise the same design of the control arrangement 1 according to FIG. 1 in that the sensing piston 6* is now in contact with feedback surface 8 of the yoke 5 by means of a roller 22 at the outer end of that sensing piston 10, the roller being rotatably mounted about an axis 21 oriented parallel to the pivot axis of the yoke 5 such that the sensing piston can roll. This also results in a lower-friction, and therefore more precise, return of the pivoting position of the yoke 5 to the position regulating valve 2 as compared with the sliding contact between the sensing piston 6 and the feedback surface 8 of the control arrangement 1 according to FIG. 1.

REFERENCE CHARACTERS 1 control arrangement
1' control arrangement
1* control arrangement
2 position regulating valve
3 control piston
4 return device
5 yoke
6 sensing piston
6' sensing piston
6* sensing piston
7 return spring
8 return surface
9 component
10 outer end of sensing piston 6, 6', 6*
11 anti-friction surface
12 blind hole on sensing piston 6, 6', 6*
13 spring cap
14 bore
15 base plate, component fixed to the housing
16 electromagnet
17 anchor pin of electromagnet 16
18 pivot direction
19 spherical indentation
20 ball
21 axis
22 roller

The invention claimed is:

1. An adjusting device of a hydrostatic module comprising:
at least one axial piston machine which communicates with a yoke such that a displacement volume of the at least one axial piston machine is adjustable by pivoting of the yoke (5),
the adjusting device having a hydraulic adjusting cylinder, which is disposed radially spaced from and tangential with respect to a pivot axis of the yoke (5),
the adjusting cylinder has an adjusting piston, which is operatively connected to the yoke (5) by way of a pivot lever and the adjusting piston is biased within the adjusting cylinder by an adjusting pressure difference of a hydraulic pressure medium which acts on two opposing piston surfaces of the adjusting piston,
the adjusting device has a control arrangement (1, 1', 1*), which has a position regulating valve (2) in a form of an electromagnetically controllable hydraulic proportional valve, the position regulating valve has an axially slidable control piston (3), adjustment of an axial position of the control piston adjusts the adjusting pressure difference which acts on the two opposing piston surfaces of the adjusting piston of the adjusting cylinder,
the adjusting device has a non-positively locking mechanical return device (4), which communicates with the yoke such that a pivoting position of the yoke (5) is transferable to the control piston (3) of the position regulating valve (2), and the position regulating valve (2) being disposed axially parallel to the adjusting cylinder and disposed radially spaced from the pivot axis of the yoke (5), and the return device (4) comprising an axially movable, guided sensing piston (6, 6', 6*) and a return spring (7) in the form of a helical spring, the sensing piston and the return spring are coaxially aligned and axially adjacent to the position regulating valve (2), and
the sensing piston (6, 6', 6*) abuts a feedback surface (8) of the yoke (5), the feedback surface of the yoke is eccentric with respect to the pivot axis of the yoke and the sensing piston is operatively connected to the control piston (3) of the position regulating valve (2) by the return spring (7).

2. The adjusting device according to claim 1, wherein the feedback surface (8) of the yoke has a convex contour which is adapted to a desired control characteristic for controlling the pivoting position of the yoke (5).

3. The adjusting device according to claim 1, wherein the feedback surface (8) is formed on a component (9) that is removably attached to the yoke (5).

4. The adjusting device according to claim 1, wherein the sensing piston (6) has an outer end (10) with a smooth anti-friction surface which contacts and slides on the feedback surface (8) of the yoke (5).

5. The adjusting device according to claim 1, wherein the sensing piston (6') is in contact with the feedback surface (8) of the yoke (5) via a ball (20) at an outer end (10) of the sensing piston, and the ball is rotatably mounted in a spherical indentation (19) such that the sensing piston is rotatable.

6. The adjusting device according to claim 1, wherein the sensing piston (6*) is in contact with the feedback surface (8) of the yoke (5) via a roller (22) at an outer end of the sensing piston (10), and the roller is rotatably mounted about an axis (21) oriented parallel to the pivot axis of the yoke (5) such that the sensing piston can roll.

7. The adjusting device according to claim 1, wherein a first side of the return spring (7) is received within a central blind hole (12) of the sensing piston (6, 6', 6*), such that an end the first side of the return spring abuts the sensing piston, and a second side of the return spring abuts a spring cap (13) that is centrally disposed on the control piston (3) of the position regulating valve (2).

8. The adjusting device according to claim 1, wherein the sensing piston (6, 6', 6*) is axially movably, guided in a bore (14) of a component (15) fixed to a housing so that the sensing piston is slidable in an axial direction.

9. The adjusting device according to claim 1, wherein the position regulating valve (2) is designed as a cartridge and is disposed in a bore (14) of a component (15) fixed to a housing.

10. The adjusting device according to claim 8, wherein the sensing piston (6, 6', 6*), the return spring (7) and the position regulating valve (2) are disposed in a stepped bore

(14) of a base plate (15) of the hydrostatic module in which bearings of the yoke (5) are integrated.

11. An adjusting device of a hydrostatic module having an axial piston machine which communicates with a yoke, a displacement volume of the axial piston machine is adjustable by pivoting of the yoke about a yoke pivot axis, the adjusting device comprises:

a hydraulic adjusting cylinder defining an adjusting axis and being radially spaced from and tangential with respect to the yoke pivot axis;

an adjusting piston being operatively connected to the yoke by a pivot lever, the adjusting piston being biased along the adjusting axis, within the hydraulic adjusting cylinder, by pressure differences acting on two axially opposed surfaces of the adjusting piston;

a control arrangement comprising an electromagnetically controllable hydraulic position regulating valve which has a control piston, and the control piston is axially slidable in the regulating valve along a control piston axis, the pressure differences, acting on the adjusting piston of the adjusting cylinder, are adjustable based on an axial position of the control piston;

a non-positively locking mechanical return device communicating with the yoke such that a pivot position of the yoke is transferred to the control piston of the position regulating valve; and the position regulating valve is parallel to the adjusting cylinder along the adjusting axis and disposed radially spaced from the pivot axis of the yoke, and the return device comprising an axially movable, guided sensing piston and a return helical spring which are arranged coaxially with and axially adjacent to the position regulating valve, the sensing piston abutting against a feedback surface disposed on the yoke, and the feedback surface being eccentric with respect to the yoke pivot axis and the sensing piston being operatively connected to the control piston of the position regulating valve via the return spring such that as the yoke pivots about the yoke pivot axis, the eccentric feedback surface of the yoke biases the sensing piston axially along the control piston axis.

* * * * *